United States Patent [19]

Nakagawa et al.

[11] Patent Number: 4,908,178

[45] Date of Patent: Mar. 13, 1990

[54] METHOD OF MOLDING A SEMICONDUCTOR DEVICE

[75] Inventors: Osamu Nakagawa; Koji Yanagitani; Ikuo Sasaki; Toshinobu Banjo, all of Itami, Japan

[73] Assignee: Mitsubishi Denki Kabushiki Kaisha, Tokyo, Japan

[21] Appl. No.: 296,647

[22] Filed: Jan. 11, 1989

Related U.S. Application Data

[62] Division of Ser. No. 868,590, May 30, 1986, Pat. No. 4,818,204.

[30] Foreign Application Priority Data

May 31, 1985 [JP] Japan ................. 60-119084

[51] Int. Cl.$^4$ ............. B29C 45/02; B29C 45/14
[52] U.S. Cl. .................. 264/272.17; 264/328.4; 264/328.12
[58] Field of Search ........... 264/272.17, 328.4, 328.5, 264/328.12; 425/116, 121

[56] References Cited

U.S. PATENT DOCUMENTS

| | | | |
|---|---|---|---|
| 1,918,532 | 7/1933 | Geyer | 425/77 |
| 2,239,338 | 11/1939 | Norelli | 425/572 |
| 2,672,653 | 3/1952 | Simpkins et al. | 249/76 |
| 3,270,377 | 9/1966 | Parker | 22/68 |
| 3,659,821 | 5/1972 | Sakamoto et al. | 264/272.17 |
| 4,334,847 | 6/1982 | Schauffele | 425/227 |
| 4,513,942 | 4/1985 | Creasman | 249/95 |
| 4,599,062 | 7/1986 | Konishi | 264/272.17 |
| 4,611,983 | 9/1986 | Bielfeldt | 425/544 |

FOREIGN PATENT DOCUMENTS

| | | |
|---|---|---|
| 2214576 | 1/1973 | France . |
| 14-7625 | 5/1939 | Japan . |
| 59-60210 | 5/1981 | Japan . |
| 57-43851 | 3/1982 | Japan . |
| 59-6549 | 1/1984 | Japan . |
| 59-162015 | 9/1984 | Japan . |

Primary Examiner—James Lowe
Attorney, Agent, or Firm—Birch, Stewart, Kolasch & Birch

[57] ABSTRACT

A metal mold for plastic molding a semiconductor device by a transfer-molding method with the use of thermo-hardening plastics. The mold includes a pot section into which plastic is injected; a cavity section where a product is formed; a runner section constituting a path for the plastic from the pot section to the cavity section; a gate section provided between the runner section and the cavity section so as to reduce the cross-sectional area for the flow of the plastic which flows therethrough from the runner section to the cavity section; a flow restriction section provided in the path of the runner section so as to reduce the cross-sectional area of the flow of plastic.

4 Claims, 7 Drawing Sheets

METHOD OF MOLDING A SEMICONDUCTOR DEVICE

This application is a divisional of copending application Ser. No. 06/868,590, filed on May 30, 1986 now U.S. Pat. No. 4,818,204.

FIELD OF THE INVENTION

The present invention relates to a metal mold for plastic molding a semiconductor device. The mold is used in a transfer-molding method using thermo-hardening plastics which is a major plastics molding technique.

BACKGROUND OF THE INVENTION

A prior art metal mold for plastic molding a semiconductor device used in a transfer-molding method constitutes by a cull portion which, provided at the center of the mold, forms a base as a starting point of the plastic molding to which the plastics is introduced from a transfer pot by an injecting cylinder. The mold also includes a runner section and a gate section which form a path from the cull section to a cavity section, where a product is completed.

FIG. 5 shows a prior art metal mold for plastic molding a semiconductor device in which a cull section, a runner section, and a gate section are provided at a lower mold. In the drawing the reference numeral 1 designates a cull section, the numeral 2 designates a runner section the numeral 3 designates a gate section, and the numeral 4 designates a cavity section. The gate section is designed to reduce the cross-sectional area of the flow of the plastic by 15 to 20% after the flow passes through the runner section.

FIGS. 6, 7, and 8 show cross-sectional views of lines A to A, lines B to B, and lines C to C, respectively.

The operation of the introduction of the thermo-hardening plastics into the cavity section 4 from the cull section 1 will now be described.

Thermo-hardening plastic such as epoxy resin, is placed into a transfer and then injected into a metal mold heated up to a temperature of 150° to 190° C. The plastic in injected under an injecting pressure of 50 to 100 kg/cm$^2$ and an injection speed of 5 to 10 mm/sec. The injected plastic is melted and reacted so as to harden by receiving the heat from the metal mold. In this prior art metal mold the plastic is heated up to the temperature of the mold and completely melted only at the gate section 3.

FIG. 9 shows an example of viscosity versus time characteristics of the plastic at a temperature X° C., for example, 160° C. In FIG. 9, the region 1 is a region where the plastic is melted before the plastic enters the completely melted state at the temperature X° C., and the region 2 is a region where the hardening of the plastic is conducted.

In this prior art plastic molding metal mold of such a construction, the plastic reaches the temperature of the metal mold and enters the completely melted state at only one point along the way of the flow of the plastic, that is, at the gate section 3. Accordingly, there was a limit upon the stability of the plastic in the molded state of the product which is obtained through the uniformly melted state of the plastic, and especially, upon the reduction of voids (internal voids) existing inside the product. There is also a difficulty in reducing internal voids up to a desired amount even through the study of the condition of the molding and the flowing characteristics of the plastic.

SUMMARY OF THE INVENTION

The present invention is directed to solve the problems pointed out above, and has for its object to provide a metal mold for plastic molding a semiconductor device capable of stabilizing the molded state of the product, and especially capable of reducing internal voids inside the product.

According to the present invention, there is provided a metal mold for plastic molding a semiconductor device by a transfer-molding method with the use of thermo-hardening plastics, which includes a pot section into which plastic is injected; a cavity section where a product is formed; a runner section constituting a path for the plastic from the pot section to the cavity section; a gate section provided between the runner section and the cavity section so as to reduce the cross-sectional area for the flow of the plastic which flows therethrough from the runner section to the cavity section; and a flow restrictor section provided in the way of the runner section so as to reduce the cross-sectional area for the flow of the plastic.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
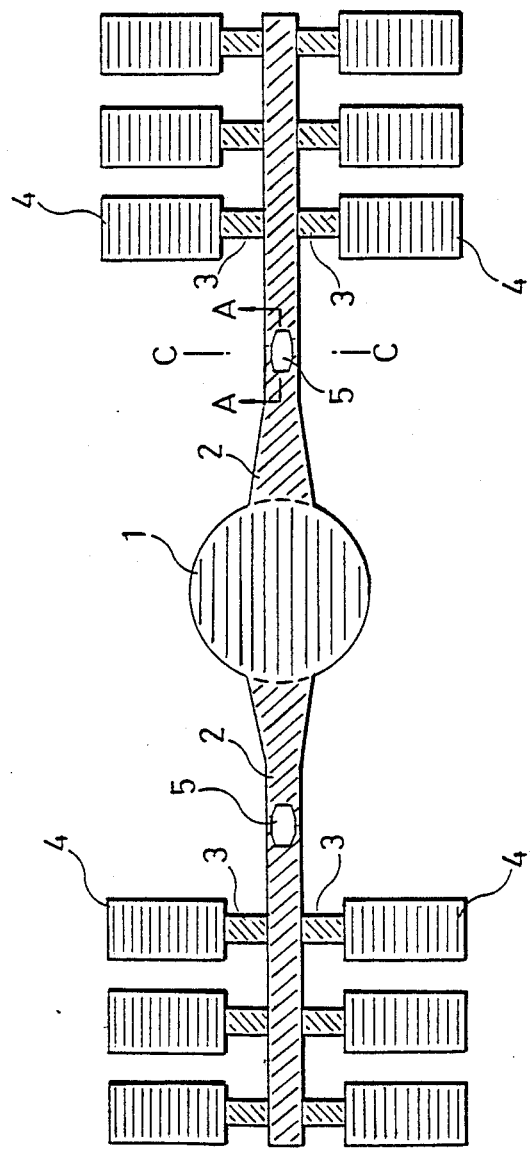
FIG. 1 is a plan view showing a metal mold for plastic molding a semiconductor device as an embodiment of the present invention.

In order to explain the present invention in detail, reference will be particularly made to FIG. 1.

Figure 5:
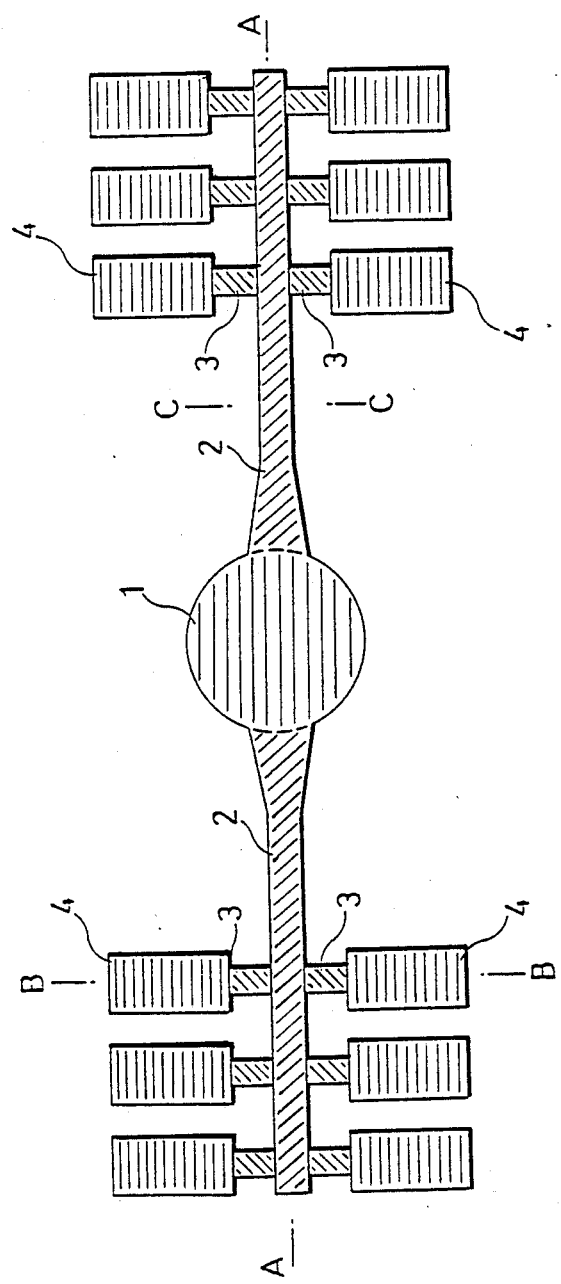
FIG. 5 is a plan view showing a prior art metal mold for plastic molding a semiconductor device.
Figure 6:
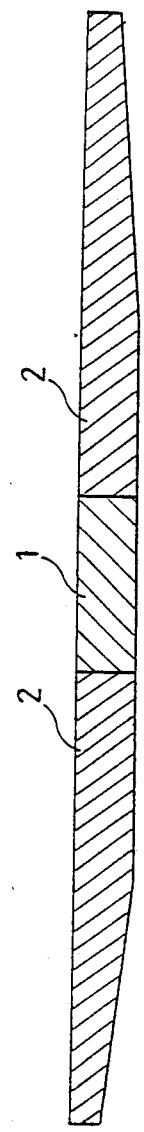
FIG. 6 is a cross-sectional view in lines A to A of FIG. 5.
Figure 7:
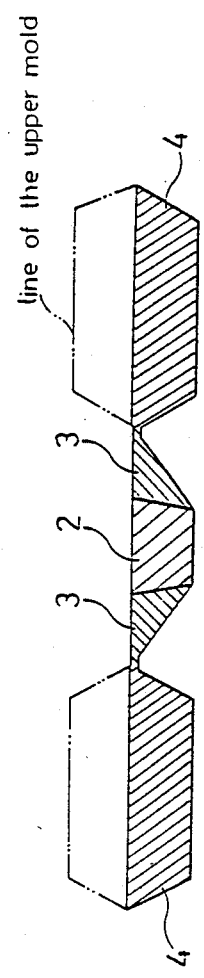
FIG. 7 is a cross-sectional view in lines B to B of FIG. 5.
Figure 8:
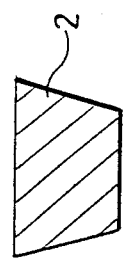
FIG. 8 is a cross-sectional view in lines C to C of FIG. 5.
Figure 9:
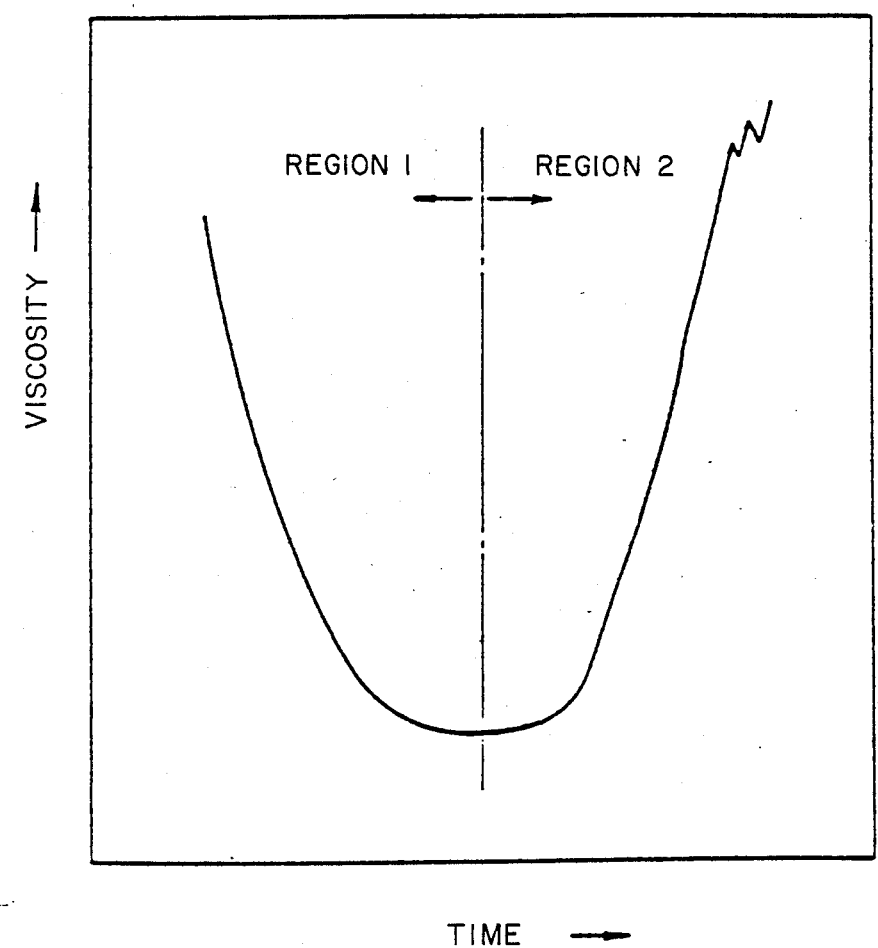

In FIG. 1 the same reference numerals are used to designate the same or corresponding elements as those shown in FIG. 5. In FIG. 1 the reference numeral 5 designates a flow restrictor projecting so as to reduce the cross-sectional area for the flow of plastic at the runner section 2 by more than 40%. This flow restrictor 5 is provided at the upper metal mold along the configuration of the runner section of the lower metal mold.

The operation and function of the present invention will be described with reference to FIGS. 2 to 4.

When plastic is injected into the metal mold from a transfer pot the plastic flows through the cull section 1, the runner section 2, and the gate section 3 while receiving the heat from the metal mold. At the flow restrictor section 5 the plastic enters the completely melted state because the cross-sectional area of the flow of the plastic is reduced at the flow restrictor section. The plastic again enters the completely melted state at the gate enters again the completely melted state at the gate, and thus the plastic is completely melted twice before reaching the cavity section 4. At the cavity section 4 the plastic is reacted and hardened to produce a product. The molded state of the product is stabilized in this way, and advantageously internal voids of the product are reduced to a great extent.

Figure 2:
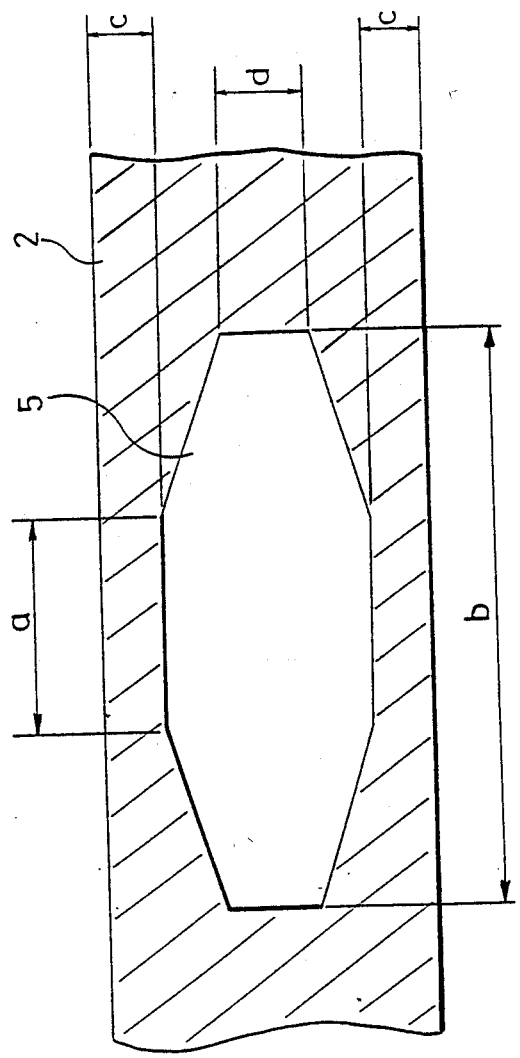
FIG. 2 is an enlarged plan view showing the flow restrictor section of the embodiment.
Figure 3:
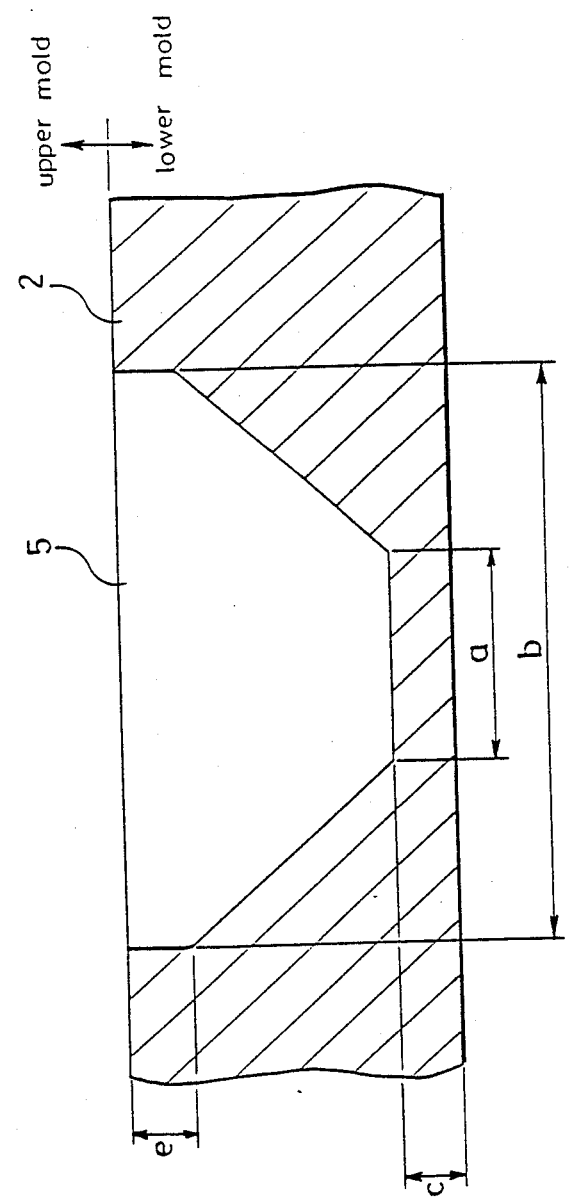
FIG. 3 is an enlarged cross-sectional view showing the flow restrictor section along the lines A to A of FIG. 1.
Figure 4:
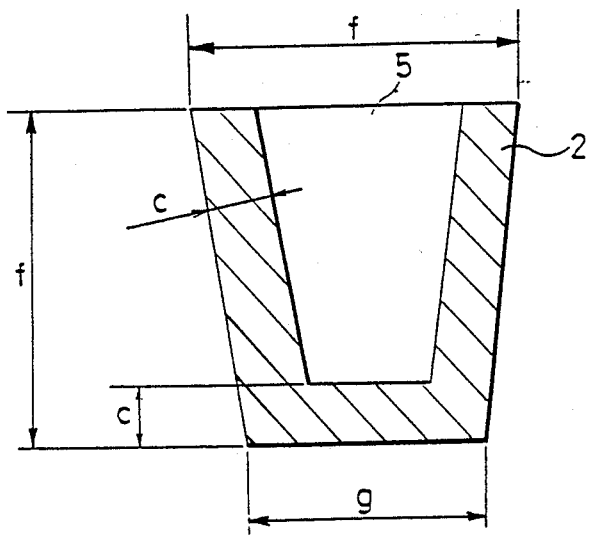
FIG. 4 is an enlarged cross-sectional view showing the flow restrictor section along the lines C to C of FIG. 1.

The Table 1 shows the number of internal voids having a diameter larger than 50 μm generated in twenty products in cases where the dimensions a to j in FIGS. 2 to 4 have each of the various values. In Table 1, the reduced area for the flow of the plastics is calculated from the values of each dimension and the cross-sectional area of the flow restrictor section of FIG. 4. The reduced area is set at 0 in a case where no flow restrictor section is provided, and it is 100 in a case where the runner section 2 is completely closed.

| specimen No. | item dimension of each section (mm) | | | | | | | reduced area for the flow of the plastics | number of internal voids |
|---|---|---|---|---|---|---|---|---|---|
| | a | b | c | d | e | f | g | | |
| 1 | 4 | 13 | 2 | 1 | 0.5 | 7 | 6 | 19 | 90 |
| 2 | ↑ | ↑ | 1.5 | ↑ | ↑ | ↑ | ↑ | 30 | 40 |
| 3 | ↑ | ↑ | 1 | ↑ | ↑ | ↑ | ↑ | 51 | 12 |
| 4 | ↑ | ↑ | 0.5 | ↑ | ↑ | ↑ | ↑ | 67 | 0 |
| 5 | 6 | ↑ | 1 | ↑ | ↑ | ↑ | ↑ | 51 | 11 |
| 6 | 4 | ↑ | ↑ | 0.5 | ↑ | ↑ | ↑ | 51 | 10 |
| 7 | no iris block section | | | | ↑ | ↑ | | 0 | 150 |

From Table 1, it is apparent that it is possible to advantageously stabilize the molded state of a product and to reduce the number of internal voids by using the present invention. Furthermore, as is apparent from Table 1, the greatest effect is obtained when the reduced cross-sectional area at the flow restrictor section is large. When the reduced area is reduced by more than 40% the number of internal voids is greatly reduced and thereby improved.

In the above illustrated embodiment, the flow restrictor 5 is provided at the upper mold so as to be a predetermined distance apart from each side surface of the runner section 2, but the flow restrictor may be provided in configurations different from that described above which allows for reducing the cross-sectional area for the flow of the plastic.

Furthermore, if the runner section is provided at an upper mold, the flow restrictor section may be provided at the lower mold.

As evident from the foregoing description, according to the present invention, a flow restrictor is provided at the runner section, and the cross-sectional area for the flow of the plastic is reduced by more than 40% along the path of the runner section, at the flow restrictor section thereby resulting in improved stability in the molded state of the product, and advantageously, the reduction of internal voids in the products.

What is claimed is:

1. A transfer-molding method which employs a metal mold for plastic molding a semiconductor device with thermo-hardening plastic, wherein said metal mold comprises:

a pot section for receiving plastic;
   a runner section operatively connected to said pot section for receiving a flow of said plastic from said pot section;
   a flow restrictor section mold in the form of an obstruction elongated in the direction of flow in said runner section, wherein said flow restrictor section is positioned medially in said runner section and projects into said runner section so as to permit flow on either side of said flow restrictor section, said flow restrictor section being tapered toward said pot section and away from said pot section, and said flow restrictor section reducing the cross-sectional area of said runner section so as to provide opportunity for complete melting of said plastic a first time so as to reduce the viscosity of said plastic;
   a gate section operatively connected to said runner section for receiving said plastic from said runner section, and having a cross-sectional area reduced from that of said runner section to provide a further opportunity for melting said plastic to insure complete melting of said plastic and to reduce the viscosity of said plastic; and
   a cavity section operatively connected to said gate section for receiving said plastic and for forming said plastic into a product, whereby said flow restrictor section provides for a reduction in the number of internal voids in said product, said transfer-molding method comprising:
   heating said metal mold to a temperature so as to melt said plastic;
   injecting said plastic into said metal mold with an effective injecting pressure and at an effective injecting speed; and
   hardening said plastic to form said semiconductor device.

2. A method for using a metal mold as defined in claim 1, wherein said metal mold comprises an upper mold and a lower mold, said lower mold containing at least a portion of said pot section, said runner section, said gate section and said cavity section, and said upper mold being operatively connected to said flow restrictor section, wherein said metal mold is heated to a temperature of from 150° to 190° C. and said plastic is injected into said metal mold with an injecting pressure of from 50 to 100 kg/cm² and at an injecting speed of from 5 to 10 mm/second.

3. A method for using a metal mold as defined in claim 2, wherein said flow restrictor section reduces the cross-sectional area of said flow of said plastic in said runner section by an amount of from 30 to 70%, and wherein said gate section reduces the cross-sectional area of said flow of said plastic from said runner section by an amount of from 15 to 20%, wherein said metal mold is heated to a temperature of from 150° to 190° C. and said plastic is injected into said metal mold with an injecting pressure of from 50 to 100 kg/cm² and at an injecting speed of from 5 to 10 mm/second.

4. A method for using a metal mold as defined in claim 3, wherein said metal mold comprises an upper mold and a lower mold, said lower mold containing at least a portion of said pot section, said runner section, said gate section and said cavity section and said upper mold being operatively connected to said flow restrictor section, wherein said metal mold is heated to a temperature of from 150° to 190° C. and said plastic is injected into said metal mold with an injecting pressure of from 50 to 100 kg/cm$^2$ and at an injecting speed of from 5 to 10 mm/second.

* * * * *